(12) United States Patent
Spaulding (10) Patent No.: US 6,216,648 B1
(45) Date of Patent: Apr. 17, 2001

(54) INTERNAL COMBUSTION ENGINE WITH PNEUMATICALLY CONTROLLED VARIABLE EXHAUST VALVE

(75) Inventor: Gregory L. Spaulding, Thief River Falls, MN (US)

(73) Assignee: Arctic Cat, Inc., Thief River Falls, MN (US)

( * ) Notice: Subject to any disclaimer, the term of this patent is extended or adjusted under 35 U.S.C. 154(b) by 0 days.

(21) Appl. No.: 09/312,574

(22) Filed: May 14, 1999

(51) Int. Cl.[7] ..................................................... F02B 75/02
(52) U.S. Cl. ....................................... 123/65 PE; 123/323
(58) Field of Search ................................. 123/65 PE, 323

(56) References Cited

U.S. PATENT DOCUMENTS

| | | |
|---|---|---|
| 4,391,234 | 7/1983 | Holzleitner . |
| 4,399,788 | 8/1983 | Bostelmann . |
| 4,763,613 * | 8/1988 | Arahata et al. .................. 123/65 PE |
| 5,588,402 * | 12/1996 | Lawrence ......................... 123/65 PE |

* cited by examiner

Primary Examiner—Noah P. Kamen
(74) Attorney, Agent, or Firm—Merchant & Gould P.C.

(57) ABSTRACT

An internal combustion engine has a variable flow passage, e.g. an exhaust passage, in communication with the cylinder of the engine. A valve is positioned in the passage, restricting the passage to reduce the flow therethrough. A control mechanism varies the position of the valve by making use of positive and negative pressure, which can be supplied from the engine crankcase or an independent source. The control of positive or negative pressure supply can be based on engine speed, engine load or throttle position. The control mechanism can include a diaphragm located in a pressure chamber to which the positive and negative pressure is supplied.

4 Claims, 6 Drawing Sheets

FIG.6B ial combustion engine generally include at least one cylinder and a reciprocating piston within the cylinder connected to a crankcase. The cylinder is generally built with at least one intake (transfer) port and at least one exhaust port formed in the side walls of the cylinder.

INTERNAL COMBUSTION ENGINE WITH PNEUMATICALLY CONTROLLED VARIABLE EXHAUST VALVE

BACKGROUND OF THE INVENTION

Internal combustion engines generally include at least one cylinder and a reciprocating piston within the cylinder connected to a crankcase. The cylinder is generally built with at least one intake (transfer) port and at least one exhaust port formed in the side walls of the cylinder.

During the engine's operation, the reciprocating piston within the cylinder alternately opens and closes the intake and exhaust ports. Initially, the intake port opens in communication with an intake passage and feeds an air/fuel mixture to the cylinder for combustion. Subsequently, the exhaust port opens to allow combusted spent gases to exit through the exhaust port in communication with an exhaust passage. This cycle is repeated.

However, since the exhaust port is fixed in size and location within the cylinder, the amount of time that this port is open for communicating the air/fuel mixture or spent gases with the cylinder bore varies according to the relative speed and position of the piston. For example, at any fixed time with respect to the engine's internal cycle, the piston may be fully blocking, fully opening or partially blocking the ports.

The engine's performance depends on the engine's cycle of opening and closing the exhaust and intake ports. In general, maintaining the exhaust passage open for a longer period improves the engine's performance at higher engine speeds. Conversely, keeping the exhaust passage open for a shorter period improves the engine's performance at lower engine speeds. Accordingly, to optimize the engine's performance, it is desirable to variably control the period during which the exhaust valve or passage is open based on the speed of the engine. Therefore, it is desirable to provide an exhaust valve having a variable valve timing that is based on the current operating conditions of the engine. For example, it is desirable to provide a variable exhaust period based on the current engine speed, load, or throttle position.

Figure 1:
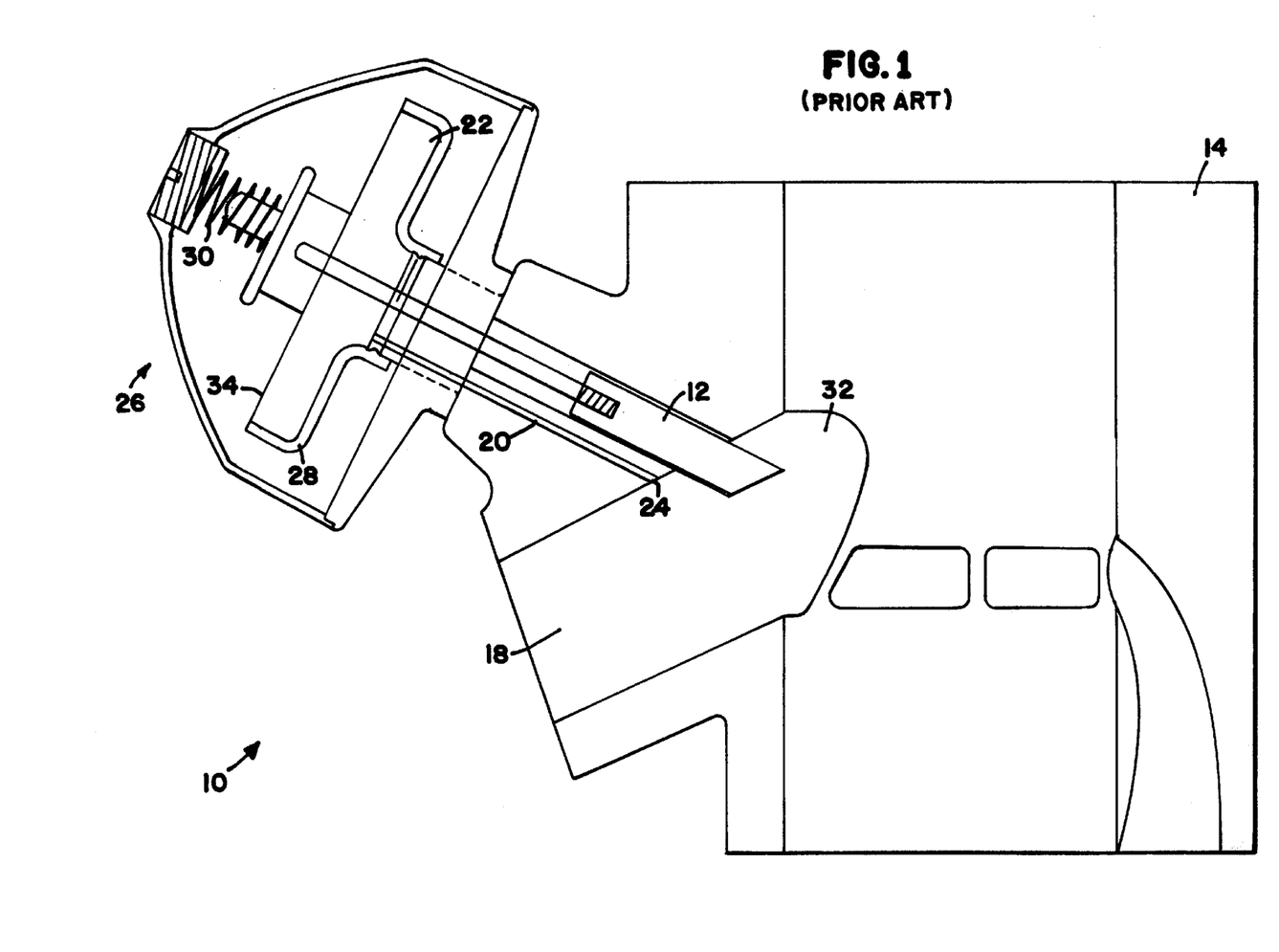
FIG. 1 is a sectional view of a cylinder of an internal combustion engine in accordance with the prior art.

Several attempts have been made in the prior art to provide a mechanism for controlling the amount of time that the exhaust port is open. For example, FIG. 1 illustrates an internal combustion engine 10 according to U.S. Pat. No. 4,399,788 to Bostelmann. The Bostelmann ('788) patent teaches the technique of utilizing a restricting member 12 mounted within the cylinder 14 structure for adjusting the exhaust valve position based on the gas pressure within the exhaust passage 18. The positive pressure generated in the exhaust passage 18 is communicated via an orifice 24 in the exhaust passage 18 through a pressure tract 20, whereby it inflates a pressure chamber 22 of the valve control mechanism 26.

The valve control mechanism 26 comprises a flexible diaphragm 28 to which the positive exhaust gas pressure is applied. The diaphragm 28 and restricting member 12 are attached to a rigid cover 34 biased by a return spring 30 that opposes the exhaust gas pressure. Accordingly, when the positive pressure generated in the exhaust passage 18 exceeds the downward force of the return spring 30, the rigid cover 34 lifts and retracts the restricting member 12. The valve port restricting member 12 is thereby adapted to the exhaust passage 18 for varying the opening of the exhaust port 32 from a full flow position to a restricting flow position. The restricting member 12 effectively varies the axial extent of the exhaust port 32 along the axial length of the cylinder 14.

Varying the axial extent of the exhaust port 32 along the axial extent of the cylinder 14 relative to a reciprocating piston (not shown), varies the period for which the exhaust port 32 is open or closed during the engine's 10 cycle. Generally, higher engine speed produces a greater pressure. Accordingly, the restricting member 12 is adjusted to effectively provide a larger exhaust port 32 opening. The valve control mechanism 26 only responds to positive pressure for moving the restricting member 12 in one direction and responds to the spring 30 force for moving the restricting member 12 in the opposite direction.

Figure 2:
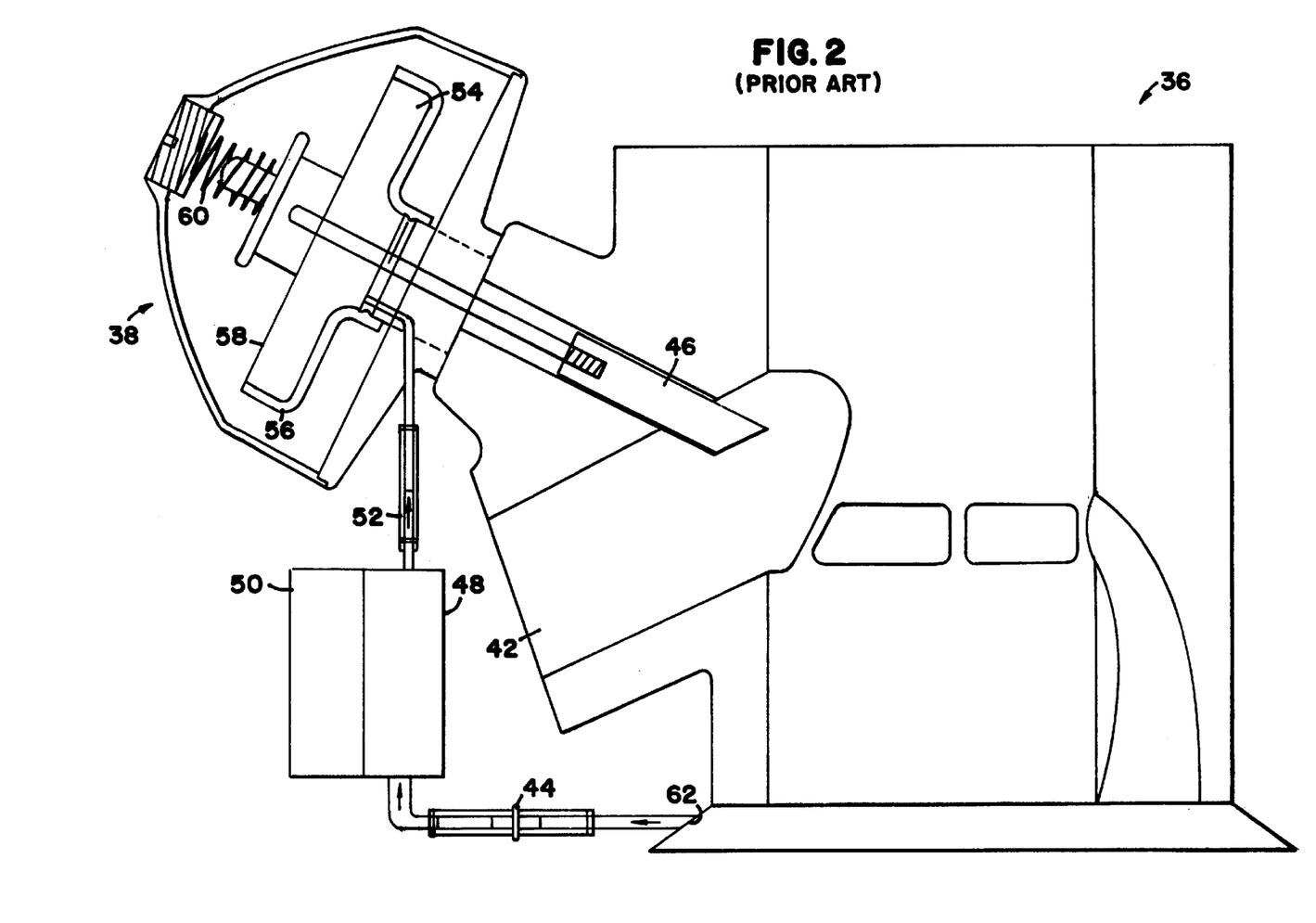
FIG. 2 is a sectional view of a cylinder of another internal combustion engine in accordance with the prior art.

FIG. 2 illustrates an internal combustion engine, shown generally at 36, similar to the mechanism illustrated in FIG. 1. The engine 36 features a valve control mechanism 38. The pressure is communicated through orifice 62, and is directed by a one-way valve 44, through an electronically operated valve 48 and eventually to a pressure chamber 54. The electronically operated valve 48 is controlled by a CDI ignition unit 50, for example. As the pressure chamber 54 pressurizes and overcomes the spring 60 force, a restricting member 46 is retracted from the exhaust passage 42. Similarly, as the pressure decreases, the restricting member 46 is extended into the exhaust passage 42. The valve control mechanism 38 only responds to positive pressure for moving the restricting member 46 in one direction and responds to the spring 60 force for moving the restricting member 46 in the opposite direction.

The CDI ignition unit 50 provides an RPM activated signal to the electronically operated valve 48 at a predetermined engine RPM. At such time, the valve 48 allows positive pressure to communicate with the exhaust valve control mechanism 38 through a pressure feedline 52. The positive pressure pressurizes the pressure chamber 54. The pressure inflates the flexible diaphragm 56 attached to a rigid cover 58. When the CDI signal is canceled, the electronically operated valve 48 closes and disconnects the pressure feed from the one-way valve 44 to the pressure chamber 54. The force of the return spring 60 then repositions the exhaust valve to its down position.

Figure 5A:
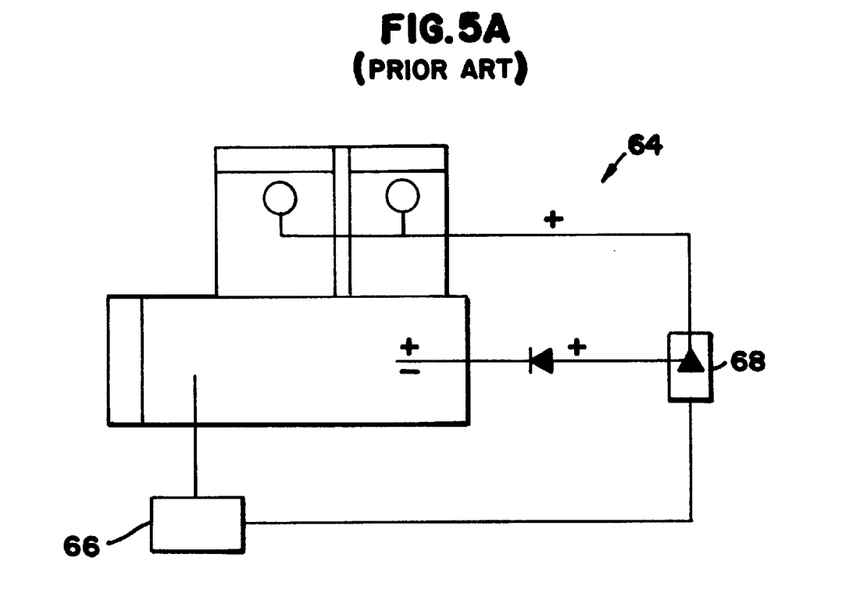
FIG. 5A is a schematic diagram of a one-way electronically operated valve in accordance with the prior art.

The electronically operated valves used in Bostelmann ('788) operate by opening only to positive pressures. For example, (FIG. 5A) illustrates a typical CDI valve unit 64 for activating the electronic pressure switch. The valve unit 64 comprises a CDI switch 66 and a one-way solenoid valve 68.

Thus, prior art valve actuation systems comprise exhaust valve control mechanisms that operate only in response to positive pressure signals generated within the crankcase or the exhaust passage, and to the mechanical force of a return spring. Furthermore, the pressure cavities in these systems are flexible on all surfaces except one. Accordingly, negative pressure would have a limited effect due to limited non-moving pressure chamber surfaces. In addition, prior art systems generally must include a return spring, since no other pressure is available to force the valve assembly back into its down position.

Therefore, there is a need in the art for an exhaust valve control mechanism that responds to positive and negative pressure. For example, there is a need for an exhaust valve control mechanism that opens in response to a positive or negative pressure signal and closes in response to the opposite signal. Furthermore, there is a need in the art for an exhaust valve control system having a pressure chamber that is flexible only on one surface, thereby allowing both negative and positive pressures to be utilized. There is also a need in the art for an exhaust valve that does not utilize return springs. Finally, there also is a need in the art for an electrically switchable valve that opens on negative pressures or that closes on positive pressures or vice versa.

SUMMARY OF THE INVENTION

The invention is directed to an apparatus that comprises an exhaust valve control mechanism that is responsive to both positive and negative pressure from the crankcase, or from an independent source such as a pressure/vacuum pump. For the purposes of the present application, an independent source of pressure is one in which the pressure is not generated directly by the reciprocating motion of the piston in the cylinder, for example the separate pressure/vacuum pump mentioned above. The control of the application of positive or negative pressure can be based, for example, on engine speed, engine load, or throttle position. The exhaust valve control mechanism can use two one-way valves controlled for example by an electronic switch, in selecting the application of positive or negative pressure. In this case, one valve directs positive pressures, and another valve directs negative pressures. The one-way valves communicate either positive or negative pressures from the crankcase or an independent source to an exhaust valve pressure/vacuum chamber. The switch can be controlled with a signal responsive to engine speed, engine load or throttle position to provide positive or negative pressure to the chamber as needed.

A flexible diaphragm located in the pressure/vacuum chamber is coupled to an exhaust valve (i.e. an exhaust passage restricting member). The diaphragm is responsive to both positive and negative pressures communicated to the pressure/vacuum chamber. Positive or negative pressures may be supplied from the crankcase or an independent source. Signals for proportionally controlling the amount of positive pressure or negative pressure to apply to the pressure/vacuum chamber, and thus the position of the exhaust valve, may be supplied, for example, from engine load sensing units or throttle position detectors, as well as from engine speed sensors. In response to applied positive and negative pressures, the diaphragm controls the relative displacement of the exhaust valve within the exhaust passage to effectively regulate the length of time the exhaust port is in communication with a cylinder bore during the engine's operating cycle.

In one embodiment, an ignition unit, for example a CDI, provides a signal to an electronically operated valve, it being noted that other ignition systems such digital ignition systems also are suitable for providing the desired signal. This valve communicates either a positive or negative pressure to the pressure/vacuum chamber in response to the speed (RPM) of the engine as measured by the ignition unit. After one pressure signal stops (e.g. positive), the opposite signal (e.g. negative) is activated, or vice versa. There may be a delay in the shift of position. In this embodiment, the speed of the engine determines the signal which determines the valve position. The valve position determines the nature of the position of the diaphragm. Accordingly, the position of the diaphragm determines the relative displacement of the exhaust valve within the exhaust passage.

Furthermore, the operating positive or negative pressures may be supplied either directly from the crankcase or independently, for example, from a separate pump. In either case, no mechanical springs are required to actuate the exhaust valve mechanism in either direction.

Therefore, one embodiment of the present invention provides an internal combustion engine comprising a crankcase and a cylinder structure having an inside peripheral surface defining a cylinder bore. The cylinder structure is formed with a port having an axial extent along the axis of the cylinder bore and a passage in communication with the port, and the cylinder structure is connected to said crankcase. The engine further comprises a piston, which is axially reciprocal within the cylinder bore and is adapted to open and close the port. A variable valve is operatively positioned in the passage, and is operatively adjustable between a full flow position in which the port is fully exposed along its axial extent; and a restricting flow position in which the port is restricted along its axial extent. A valve control mechanism that is operatively coupled to the variable valve and is operable to adjust the restriction of said port along its axial extent from a full-flow position to a restricting position in response to positive and negative pressures.

BRIEF DESCRIPTION OF THE DRAWINGS

These and other features, aspects and advantages of the invention will become better understood with regard to the following non-limiting description and drawings where.

DETAILED DESCRIPTION

The embodiments of the invention described herein are implemented as an exhaust valve control mechanism that uses either positive or negative crankcase pressure to apply either a positive pressure or negative pressure to an exhaust valve pressure/vacuum chamber. The pressure or vacuum developed in the chamber operatively controls a passage valve member. The passage valve controls the extent of the port along the axial length of the cylinder bore. This is accomplished by advancing or retracting the passage valve member into, or out of, the passage in response to positive or negative pressures in the chamber.

In one example, the apparatus utilizes two one way valves connected to an electronic switch, one valve for directing positive pressures and another valve for directing negative pressures. The ignition unit, for example a CDI, provides a signal to the electronically operated valve, which determines whether positive or negative pressure is directed to the valve control mechanism's pressure/vacuum chamber. The positive or negative switching signal is determined, for example, by the speed (RPM) of the internal combustion engine at the CDI unit. When one pressure signal is stopped, the opposite signal is activated. It also is possible to base the switching signal on other criteria, for example engine load or throttle position, or on a combination two or more of engine speed, engine load and throttle position.

Figure 3:
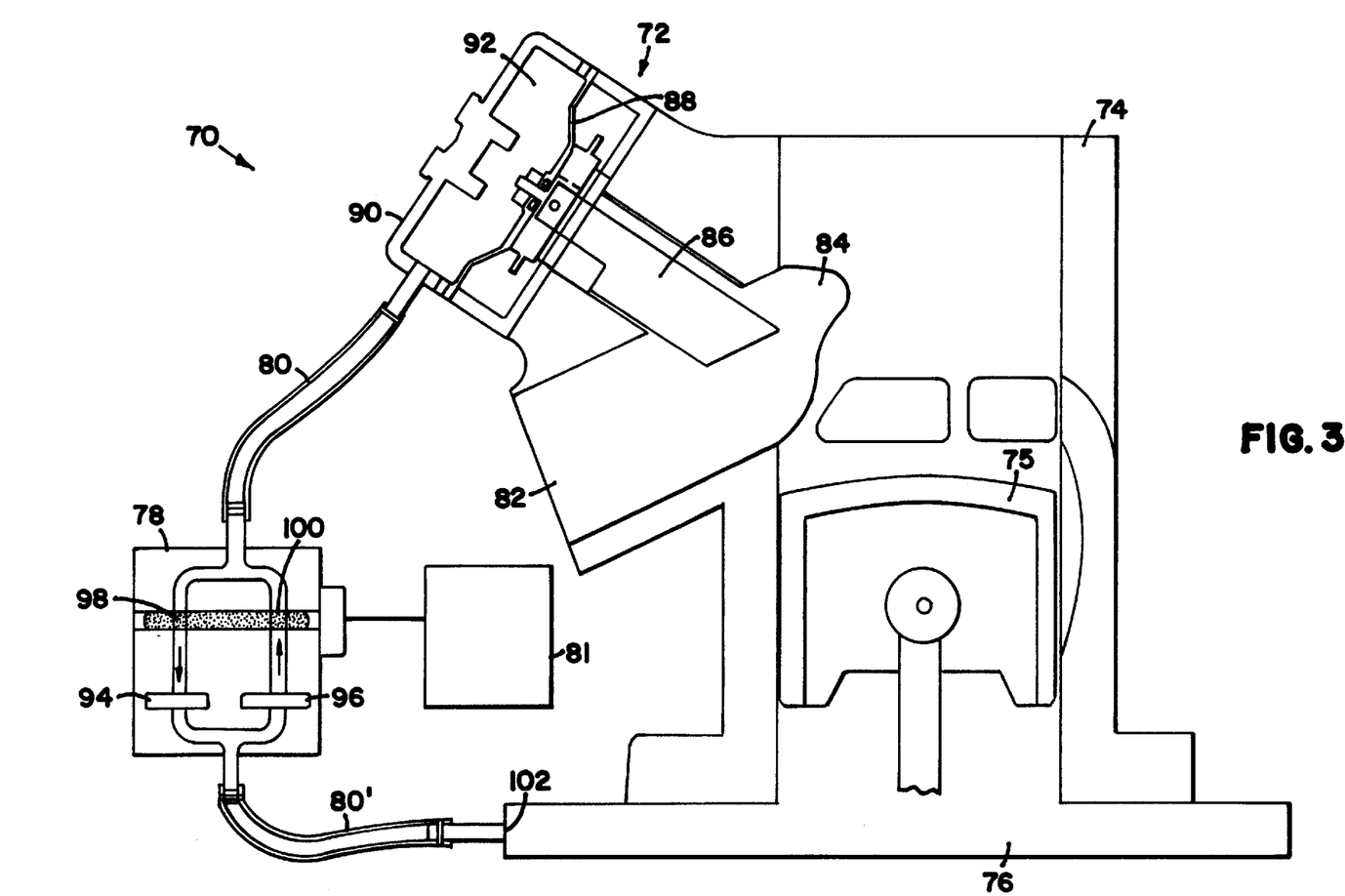
FIG. 3 is a sectional view of a cylinder of an internal combustion engine in accordance with one embodiment of the invention.

Turning now to FIG. 3, an internal combustion engine 70 in accordance with one embodiment of the invention is illustrated. The engine 70 comprises an exhaust valve control mechanism 72, a cylinder 74, a piston 75, a crankcase 76 and an electronically operated valve 78 controlled by a CDI ignition unit 81. The electronically operated valve 78 communicates positive or negative pressure from the crankcase 76 to the exhaust valve control mechanism 72 via pressure feedlines 80 and 80'. The engine may be a two-stroke engine, and the present invention is useful, for example, for snowmobiles and personal watercraft, as well as other two stroke engine applications.

An exhaust passage 82 is in communication with an exhaust port 84 within the cylinder 74 bore. The piston 75 reciprocates within the cylinder 74 bore to open and close the exhaust port 84 and communicate spent gases from the cylinder 74 bore to the exhaust passage 82.

The exhaust valve control mechanism 72 comprises an exhaust valve 86 that acts as a restricting member within the exhaust passage 82 for restricting the opening of exhaust port 84. The exhaust valve control mechanism 72 further comprises a flexible diaphragm 88 and a rigid cup-shaped cover 90. The diaphragm 88 and the cover 90 form a pressure/vacuum chamber 92 between one side of the flexible diaphragm 88 and the interior surface of the rigid cup shaped cover 90.

The electronically operated valve 78 comprises a negative pressure one-way valve 94 and a positive pressure one-way valve 96. The CDI ignition unit 81 communicates with valve 78 to allow either a negative or positive pressure to be communicated from the crankcase 76 to the pressure/vacuum chamber 92. Positive and negative pressure is communicated from the crankcase 76 (or independent source) to the electronically operated valve 78 via orifice 102 and pressure feedline 80'. Positive pressure is communicated from the electronically operated valve 78 to the pressure/vacuum chamber through port 100. Similarly, negative pressure is communicated through port 98. As the piston 75 reciprocates up and down within the cylinder bore 74, vacuum ($P^-$) and pressure ($P^+$), respectively, are created in the crankcase 76, and it is this vacuum or pressure that is communicated to the pressure/vacuum chamber 92.

Figure 4:
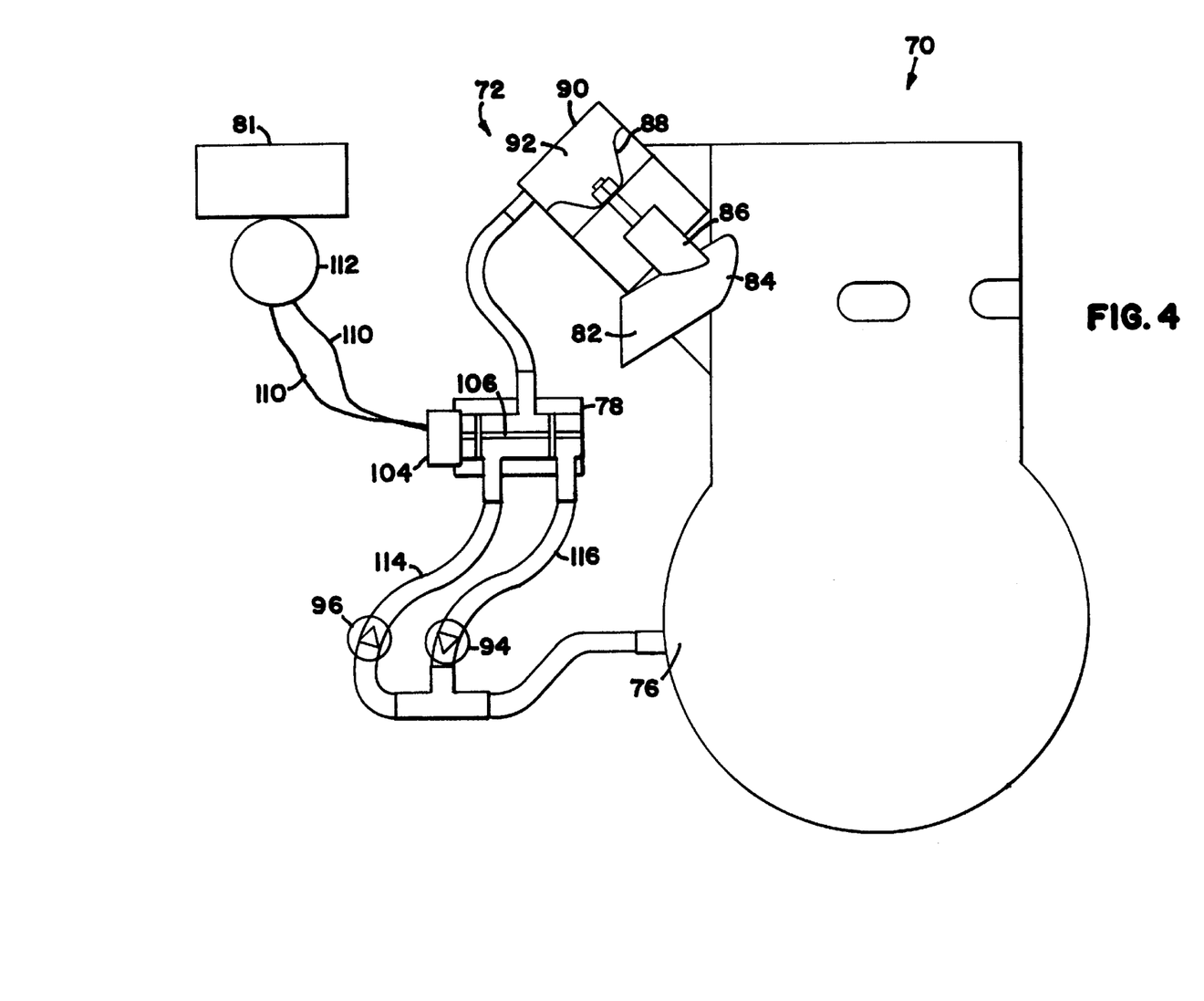
FIG. 4 is a sectional view of an internal combustion engine provided in accordance with one embodiment of the invention.

Turning now to FIG. 4, if an impulse line is tapped into the crankcase 76, the $P^+$ and $P^-$ flow paths, 114, 116, respectively, can be controlled by check valves 96, 94, respectively. The check valves 96, 94 act as positive pressure and/or vacuum controls. A three-way, two position electronically operated valve 78 determines which flow path ($P^+$ or $P^-$) to communicate to the pressure/vacuum chamber 92.

The flow path is controlled by a plunger 106 inside of the air valve 78. The plunger is movable between two positions. One position directs $P^+$ flow to the pressure/vacuum chamber 92 and the other directs $P^-$ flow from the pressure/vacuum chamber 92. The $P^+$ is set such that when the CDI unit 81 reads low engine speeds, the solenoid power supply 112 is inactive and the plunger spring 108 holds the $P^+$ flow path 114 open.

Similarly, at higher engine speeds, the CDI unit 81 signals the power supply 112 to activate the solenoid 104. The power supply 112 energizes the solenoid 104 through electrical wires 110. Accordingly, the plunger moves into its second position to open the $P^-$ flow path 116. Once the engine speed is reduced, the CDI unit 81 signals the solenoid power supply 112 to reverse the plunger so that it returns to its original position, directing $P^+$ flow to the pressure/vacuum chamber 92. It also is possible to provide a return mechanism, e.g. a spring, that urges the plunger in one direction so that the plunger is returned to the original position upon deactivation of the solenoid. This process repeats during the operation of the engine 70. The $P^+$ and $P^-$ flows fill or empty the pressure/vacuum chamber 92 to equalize the $P^+$ or $P^-$ pressures generated in the crankcase 76.

Since the pressure/vacuum chamber 92 is housed by a rigid cup shaped cover 90 including a flexible diaphragm 88, the pressure/vacuum chamber 92 acts as a variable volume chamber. As the volume of the chamber 92 changes, so does the position of the exhaust valve 86 within the engine's exhaust passage 82. The variable exhaust valve control mechanism 72 creates a smaller exhaust port 84 at slower engine speeds to increase low-end to mid-range engine performance. Likewise, the variable exhaust valve control mechanism creates a larger exhaust port 84 at higher engine speeds to increase the performance of the engine at higher speeds.

Figure 5B:
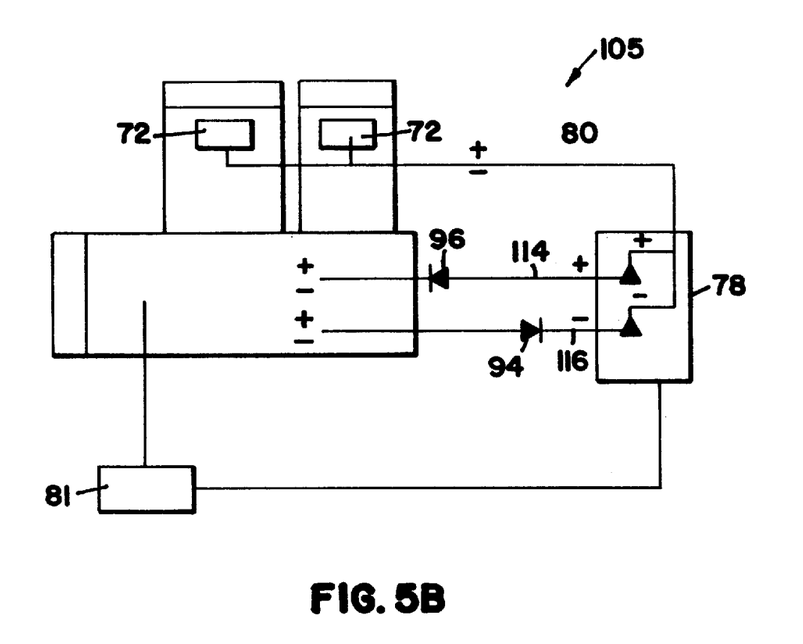
FIG. 5B is a schematic diagram of an electronically operated valve in accordance with one embodiment of the invention.

Turning now to FIG. 5B, a schematic representation of a valve unit 105 is shown. CDI unit 81 activates the electronically operated valve 78 to direct positive or negative flows through check valves 96 and 94, respectively, and $P^+$ and $P^-$ flow paths, 114, 116, respectively. Accordingly, positive or negative pressures are communicated to the exhaust valve control mechanism 72 (FIG. 4) through pressure feedline 80.

Figure 6A:
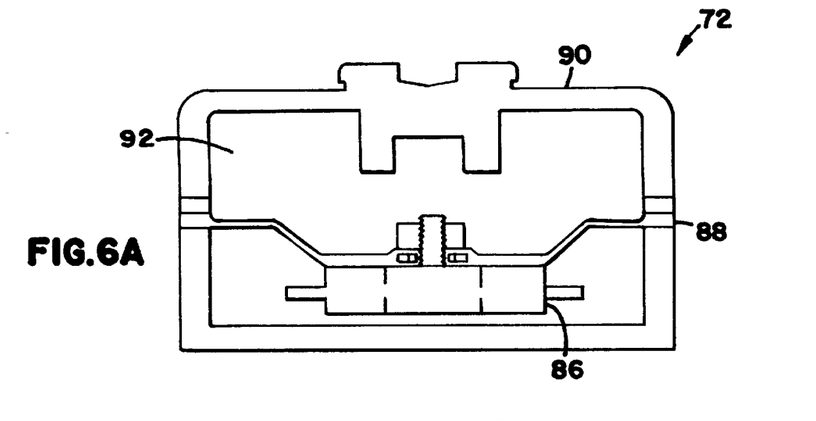
FIGS. 6A and 6B are a sectional view (FIG. 6A) and an exploded view (FIG. 6B) of the exhaust valve control mechanism in accordance with one embodiment of the invention.
Figure 6B:
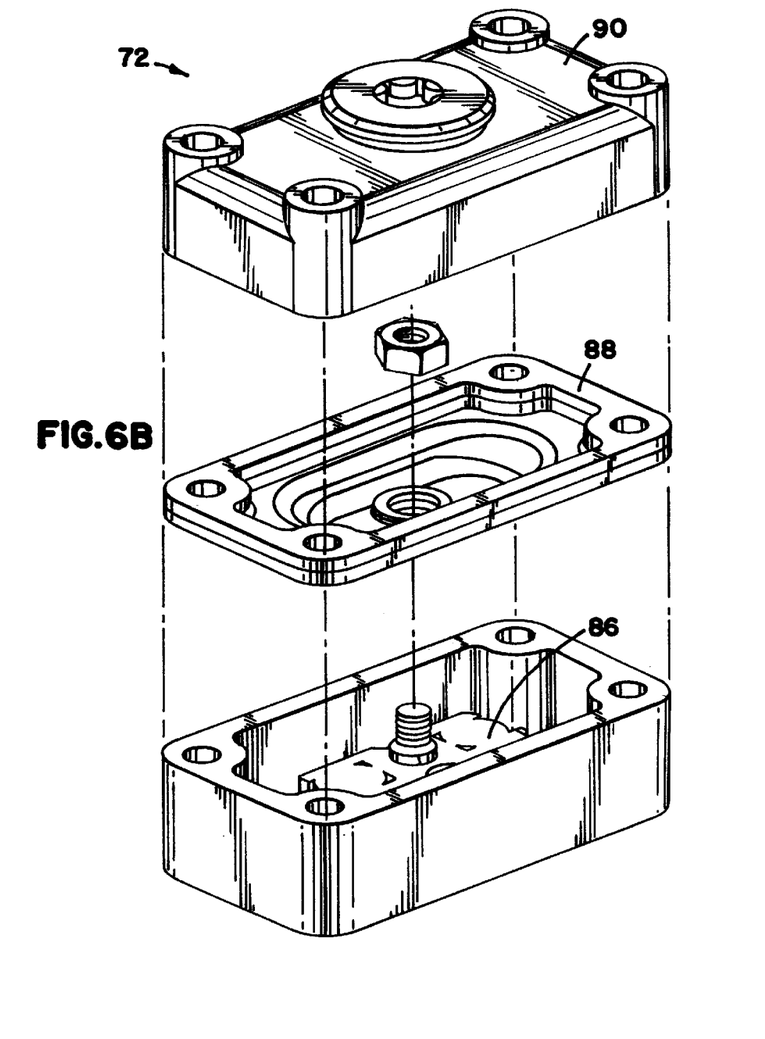

FIGS. 6A and 6B illustrate cross sectional and exploded views, respectively, of the housing comprising the exhaust valve control mechanism 72. The pressure/vacuum chamber 92 is formed by the interior surface of rigid cup shaped housing 90 and one side of flexible diaphragm 88. The other side of the diaphragm 88 is oriented toward the cylinder side of the engine. The flexible diaphragm 88 is coupled to the exhaust valve 86 (only a portion of the valve shown).

Various changes and modifications in the specifically described embodiments will be apparent to the skilled artisan. Although crankcase 76 pressure/vacuum is used to generate the $P^+$ and $P^-$ pressures required to operate the valve control mechanism 72, an independent pressure/vacuum pump operating independently of crankcase 76 pressure may be utilized. For example, a pressure/vacuum pump that generates a pressure or a vacuum in response to a control signal, for example based on engine speed, engine load, or throttle position, may be utilized to supply the proper pressure signal through pressure feedline 80' to electronically operated valve 78 and finally to the pressure/vacuum chamber 92, independent of the crankcase pressure or vacuum.

Furthermore, the valve 78 need not be operated electronically. For example, a pneumatically operated valve could be substituted for the electronically operated valve 78. The pneumatically operated valve would select whether to direct $P^+$ or $P^-$ pressures/vacuum to the pressure/vacuum chamber 92 in response to a pneumatic signal representative of engine speed (or other criteria such as engine load or throttle position), rather than an electronic signal. For example, various commercially available engine speed (RPM) sensors could be used. An output signal from the sensor would actuate a pressure switch which in turn would actuate the pneumatically operated valve. Accordingly, the appropriate $P^+$ or $P^-$ pressure/vacuum would be provided to the pressure/vacuum chamber 92. The output signal from the sensor may be electronic, pneumatic, mechanical or any useable form of electromechanical energy, provided that the signal is in response to the engine speed (RPM), engine load, throttle position, etc. and is capable of actuating an electronically or pneumatically operated valve.

The above specification, examples and data provide a complete description of the manufacture and use of the composition of the invention. Since many embodiments of the invention can be made without departing from the spirit and scope of the invention, the invention resides in the claims hereinafter appended.

The claimed invention is:

1. An internal combustion engine comprising:
    a crankcase;
    a cylinder structure having an inside peripheral surface defining a cylinder bore, said cylinder structure formed with a port having an axial extent along the axis of said cylinder bore and a passage in communication with said port, said cylinder structure connected to said crankcase;
    a piston, which is axially reciprocal within said cylinder bore, adapted to open and close said port;
    a valve positioned in said passage, said valve being operatively adjustable between a full flow position, wherein said port is fully exposed along its axial extent; and a restricted flow position, wherein said port is restricted along its axial extent;
    means for developing positive and negative pressures within said crankcase; and
    a valve control mechanism operatively coupled to said valve and operable to adjust the restriction of said port along its axial extent from a full-flow position to a restricting position in response to said positive and negative pressures supplied to the valve control mechanism.

2. An internal combustion engine comprising:
    a crankcase;
    a cylinder structure having an inside peripheral surface defining a cylinder bore, said cylinder structure formed with a port having an axial extent along the axis of said cylinder bore and a passage in communication with said port, said cylinder structure connected to said crankcase;
    a piston, which is axially reciprocal within said cylinder bore, adapted to open and close said port;
    a valve positioned in said passage, said valve being operatively adjustable between a full flow position, wherein said port is fully exposed along its axial extent; and a restricted flow position, wherein said port is restricted along its axial extent;
    an independent source for generating positive and negative pressures; and
    a valve control mechanism operatively coupled to said valve and operable to adjust the restriction of said port along its axial extent from a full-flow position to a restricting position in response to said positive and negative pressures supplied to the valve control mechanism.

3. The internal combustion engine according to claim 2 wherein said independent source is a pressure/vacuum pump.

4. An internal combustion engine comprising:
    a crankcase;
    a cylinder structure having an inside peripheral surface defining a cylinder bore, said cylinder structure formed with a port having an axial extent along the axis of said cylinder bore and a passage in communication with said port, said cylinder structure connected to said crankcase;
    a piston, which is axially reciprocal within said cylinder bore, adapted to open and close said port;
    a valve positioned in said passage, said valve being operatively adjustable between a full flow position, wherein said port is fully exposed along its axial extent; and a restricted flow position, wherein said port is restricted along its axial extent;
    a valve control mechanism operatively coupled to said valve, said valve control mechanism further comprising an air flow control valve, wherein the air control valve comprises first and second one-way valves, the first one-way valve supplying a positive pressure, the second one-way valve supplying a negative pressure, wherein said valve control mechanism is operable to adjust the restriction of said port along its axial extent from a full-flow position to a restricting position in response to said positive and negative pressures supplied to the valve control mechanism.

* * * * *